United States Patent
Nedelman et al.

(10) Patent No.: US 11,192,514 B2
(45) Date of Patent: Dec. 7, 2021

(54) TRIM ATTACHMENT SYSTEM (71) Applicant: Ford Global Technologies, LLC, Dearborn, MI (US)

(72) Inventors: Marc David Nedelman, Waterford, MI (US); Anatoly Gelfand, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 16/655,757

(22) Filed: Oct. 17, 2019

(65) Prior Publication Data

US 2021/0114544 A1  Apr. 22, 2021

(51) Int. Cl.
*B60R 21/214* (2011.01)
*B60R 13/02* (2006.01)
*B60R 21/232* (2011.01)
*B60R 21/231* (2011.01)

(52) U.S. Cl.
CPC ........ *B60R 21/214* (2013.01); *B60R 13/0206* (2013.01); *B60R 13/0212* (2013.01); *B60R 21/232* (2013.01); *B60R 21/23138* (2013.01); *B60R 2013/0287* (2013.01)

(58) Field of Classification Search
CPC ... B60R 21/214; B60R 21/215; B60R 21/213; A44B 18/0065
See application file for complete search history.

(56) References Cited

U.S. PATENT DOCUMENTS

| 4,290,174 | A |   | 9/1981  | Kalleberg |
|-----------|---|---|---------|-----------|
| 5,335,936 | A | * | 8/1994  | Faigle ............... B60R 21/215 280/728.2 |
| 5,460,402 | A | * | 10/1995 | Rhodes, Jr. .......... B60R 21/215 280/728.3 |
| 5,625,929 | A | * | 5/1997  | Hattori ............... A44B 18/0053 24/452 |
| 5,794,971 | A | * | 8/1998  | Boydston ............. B60R 21/01 280/728.3 |
| 6,019,411 | A |   | 2/2000  | Carter et al. |
| 6,082,759 | A | * | 7/2000  | Faigle ............... B60R 21/2165 280/728.3 |
| 6,687,962 | B2 |   | 2/2004  | Clarner et al. |
| 7,083,188 | B2 | * | 8/2006  | Henderson .......... B60R 21/201 280/728.2 |

(Continued)

*Primary Examiner* — James A English
(74) *Attorney, Agent, or Firm* — David Coppiellie; Price Heneveld LLP (57) ABSTRACT

A trim attachment system for a vehicle is provided herein. The trim attachment system includes first and second vehicle surfaces. A first fastener may be coupled to the first vehicle surface and may be configured for releasable engagement with a second fastener that is coupled to the second vehicle surface. Each of the first and second fasteners may include a substrate and a plurality of engaging stems protruding outward from the substrate. The plurality of engaging stems may be arranged into rows and columns on the substrate. The first fastener may be configured to be coupled to the second fastener, such that the plurality of engaging stems of the first fastener engage the plurality of engaging stems of the second fastener and the rows of the first fastener are generally perpendicular to the rows of the second fastener.

19 Claims, 8 Drawing Sheets

(56) References Cited

U.S. PATENT DOCUMENTS

| | | | | |
|---|---|---|---|---|
| 2002/0074778 A1* | 6/2002 | Melia | ............... | B60R 21/213 |
| | | | | 280/730.2 |
| 2013/0069349 A1* | 3/2013 | Williams | ............ | B60R 21/213 |
| | | | | 280/730.2 |
| 2013/0133176 A1* | 5/2013 | Takehara | .......... | A44B 18/0015 |
| | | | | 29/525.03 |

* cited by examiner

TRIM ATTACHMENT SYSTEM

FIELD OF THE INVENTION

The present invention generally relates to vehicle trim attachment systems. More particularly, the present invention relates to vehicle trim attachment systems having first and second fasteners that each have a plurality of engaging stems.

BACKGROUND OF THE INVENTION

Some vehicles include side curtain airbags that deploy from above the headliners of the vehicles. Deployment of the side curtain airbags often necessitates that the headliner yield to the deploying airbag with little resistance to enable the side curtain airbag to deploy quickly. A trim attachment system that stays in an aligned position during normal use of the vehicle but enables little resistance to the deployment of the airbag may be desired.

SUMMARY OF THE INVENTION

According to a first aspect of the present invention, a trim attachment system for a vehicle may include a first fastener coupled to a first vehicle surface. A second fastener may be coupled to a second vehicle surface and may be configured for releasable engagement with the first fastener. Each of the first and second fasteners may include a substrate and a plurality of engaging stems protruding outward from the substrate. The plurality of engaging stems may be arranged into rows and columns on the substrate. A row positioned between first and second adjacent rows may be generally equally distanced from the first adjacent row and the second adjacent row. A column positioned between first and second adjacent columns may be a first distance from the first adjacent column and a second distance from the second adjacent column, wherein the second distance is greater than the first distance. The first fastener may be configured to be coupled to the second fastener such that the plurality of engaging stems of the first fastener engage the plurality of engaging stems of the second fastener and the rows of the first fastener are generally perpendicular to the rows of the second fastener.

Embodiments of the first aspect of the invention can include any one or a combination of the following features:
- the first and second fasteners have engaging stem densities of about 170 engaging stems per square inch of substrate;
- the rows of the first fastener are generally perpendicular to the columns of the first fastener;
- the rows and columns of the first fastener are generally straight; and
- the plurality of engaging stems of the first and second fasteners include head portions coupled to the ends of the engaging stems distal to the ends of the engaging stems protruding from the substrate and configured to yieldingly retain the first and second fasteners in engagement with each other.

According to a second aspect of the present invention, a trim attachment system for a vehicle may include a trim panel configured to be coupled to the vehicle while in an aligned position relative to the vehicle. A first fastener may be coupled to the trim panel. A second fastener may be coupled to the vehicle and configured for releasable engagement with the first fastener. Each of the first and second fasteners may include a substrate and a plurality of engaging stems protruding outward from the substrate. The plurality of engaging stems may be arranged into rows and columns on the substrate. A row positioned between first and second adjacent rows may be generally equally distanced from the first adjacent row and the second adjacent row. A column positioned between first and second adjacent columns may be a first distance from the first adjacent column and a second distance from the second adjacent column, wherein the second distance is greater than the first distance. The first fastener may be configured to be coupled to the second fastener such that the plurality of engaging stems of the first fastener engage the plurality of engaging stems of the second fastener. Positioning the trim panel in the aligned position relative to the vehicle may orient the rows of the first fastener generally perpendicularly to the rows of the second fastener.

Embodiments of the second aspect of the invention can include any one or a combination of the following features:
- each of the first and second fasteners have engaging stem densities of about 170 engaging stems per square inch of substrate;
- the rows of the first fastener are generally perpendicular to the columns of the first fastener;
- the rows and columns of the first fastener are generally straight;
- the plurality of engaging stems of the first and second fasteners include head portions coupled to the ends of the engaging stems distal to the ends of the engaging stems protruding from the substrate and configured to yielding retain the first and second fasteners in engagement with each other;
- the trim panel comprises a headliner; and
- the plurality of engaging stems protruding outward from the substrate of the second fastener protrude in a generally vehicle-downward direction.

According to yet a third aspect of the present invention, a system for a vehicle may include a headliner operably coupled to the vehicle and operable between a first position and a second position. An airbag may be positioned vehicle-upward of at least a portion of the headliner and may be configured to be deploy from a retracted position to a deployed position. A first fastener may be coupled to the headliner. A second fastener may be coupled to the vehicle and configured for releasable engagement with the first fastener. Each of the first and second fasteners may include a substrate and a plurality of engaging stems protruding outward from the substrate, wherein the first fastener is in releasable engagement with the second fastener, such that the plurality of engaging stems of the first fastener engage the plurality of engaging stems of the second fastener when the headliner is in the first position, and deployment of the airbag from the retracted position to the deployed position moves the headliner from the first position to the second position.

Embodiments of the third aspect of the invention can include any one or a combination of the following features:
- the plurality of engaging stems are arranged into rows and columns on the substrate, a row positioned between first and second adjacent rows is generally equally distanced from the first adjacent row and the second adjacent row, a column positioned between first and second adjacent columns is a first distance from the first adjacent column and a second distance from the second adjacent column, wherein the second distance is greater than the first distance, and the rows of the first fastener are oriented generally perpendicularly to the rows of the second fastener when the headliner is in the first position;

the rows of the first fastener are generally perpendicular to the columns of the first fastener;

the rows and columns of the first fastener are generally straight;

the airbag deploys substantially vehicle-downward from the retracted position to the deployed position;

the airbag comprises an air curtain configured to cover a side window of the vehicle;

the plurality of engaging stems protruding outward from the substrate of the second fastener protrude in a generally vehicle-downward direction; and each of the first and second fasteners have engaging stem densities of about 170 engaging stems per square inch of substrate.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or endpoint of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-7B, a trim attachment system for a vehicle 10 is disclosed. The trim attachment system may include a first fastener 50A coupled to a first vehicle surface 70A. A second fastener 50B may be coupled to a second vehicle surface 70B and may be configured for releasable engagement with the first fastener 50A. Each of the first and second fasteners 50A, 50B may include a substrate 52 and a plurality of engaging stems 54 protruding outward from the substrate 52. The plurality of engaging stems 54 may be arranged into rows 58 and columns 60 on the substrate 52. A row 58 positioned between first and second adjacent rows 58 may be generally equally distanced from the first adjacent row 58 and the second adjacent row 58. A column 60 between first and second adjacent columns 60 may be a first distance from the first adjacent column 60 and a second distance from the second adjacent column 60, wherein the second distance is greater than the first distance. The first fastener 50A may be configured to be coupled to the second fastener 50B such that the plurality of engaging stems 54 of the first fastener 50A may engage the plurality of engaging stems 54 of the second fastener 50B and the rows 58 of the first fastener 50A are generally perpendicular to the rows 58 of the second fastener 50B.

Figure 1:
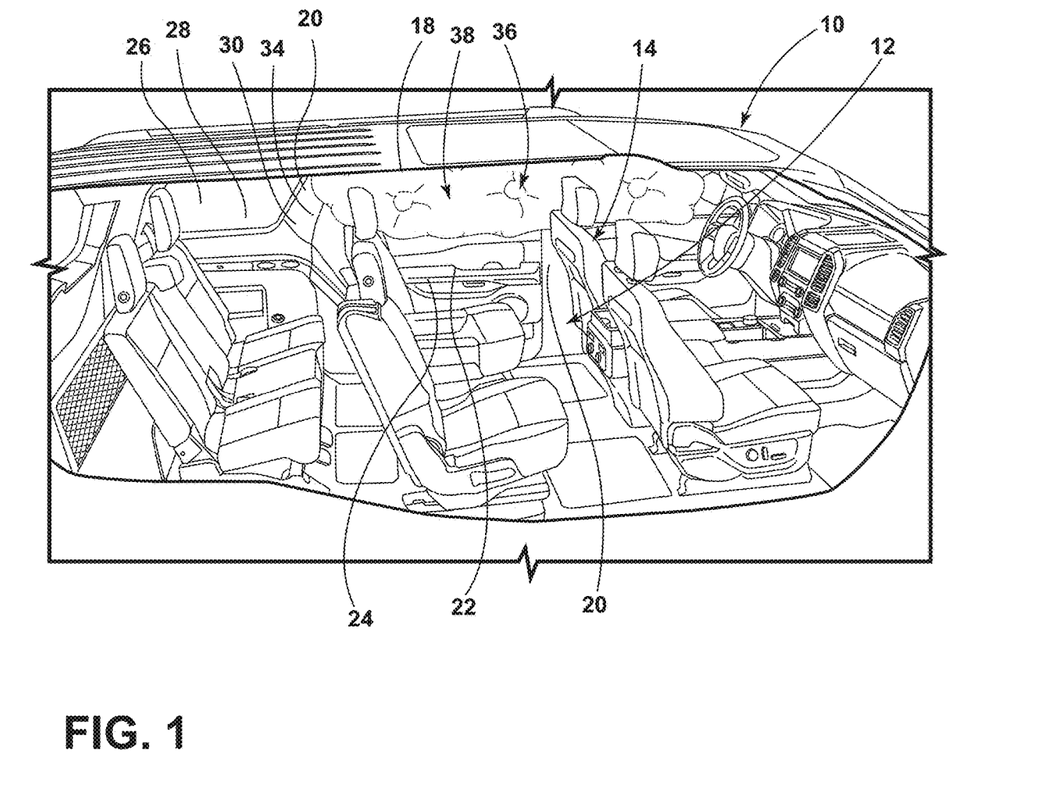
FIG. 1 is a perspective view of a vehicle illustrating a vehicle interior having a headliner and an airbag deploying downward from above the headliner, according to one embodiment.
Figure 2:
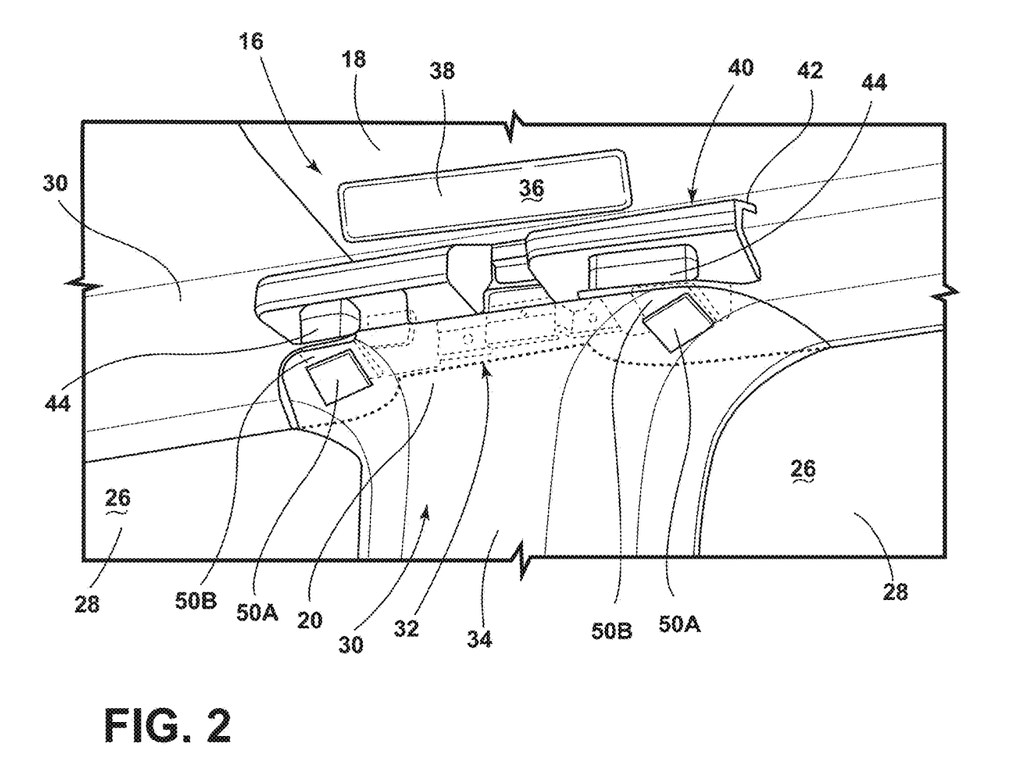
FIG. 2 is a side view of a junction between a pillar of a vehicle and a roof of the vehicle illustrating a headliner of the vehicle in phantom coupled to a ramp feature of the vehicle by first and second fasteners, according to one embodiment.

Referring now to FIGS. 1 and 2, the vehicle 10 includes a vehicle interior 12. The vehicle interior 12 may include one or more seating assemblies 14. In various embodiments, the vehicle 10 may include a body 16. The body 16 of the vehicle 10 may include a roof 18. One or more pillars 20 may extend generally vehicle-downward from the roof 18, as shown in FIG. 2. In various embodiments, the vehicle 10 may include a plurality of pillars 20. For example, in some embodiments, the body 16 of the vehicle 10 may include an A pillar, a B pillar and/or a C pillar. It is contemplated that, in various embodiments, the vehicle 10 may include more or fewer pillars 20.

In various embodiments, the vehicle 10 may include one or more doors 22. As shown in FIG. 1, the vehicle 10 may include a side door 24. The vehicle 10 may further include one or more windows 26. The windows 26 may include a windshield of the vehicle 10 and/or a back window of the vehicle 10. In various embodiments, the vehicle 10 may include side windows 28, as shown in FIG. 1. In some embodiments, the side windows 28 may be disposed within and/or coupled to the one or more doors 22. Further, in some embodiments, the side windows 28 may be positioned between pillars 20 of the vehicle 10. It is contemplated that, in some embodiments, one or more of the side windows 28 may be not disposed within and/or coupled to the one or more doors 22 of the vehicle 10.

Figure 3A:
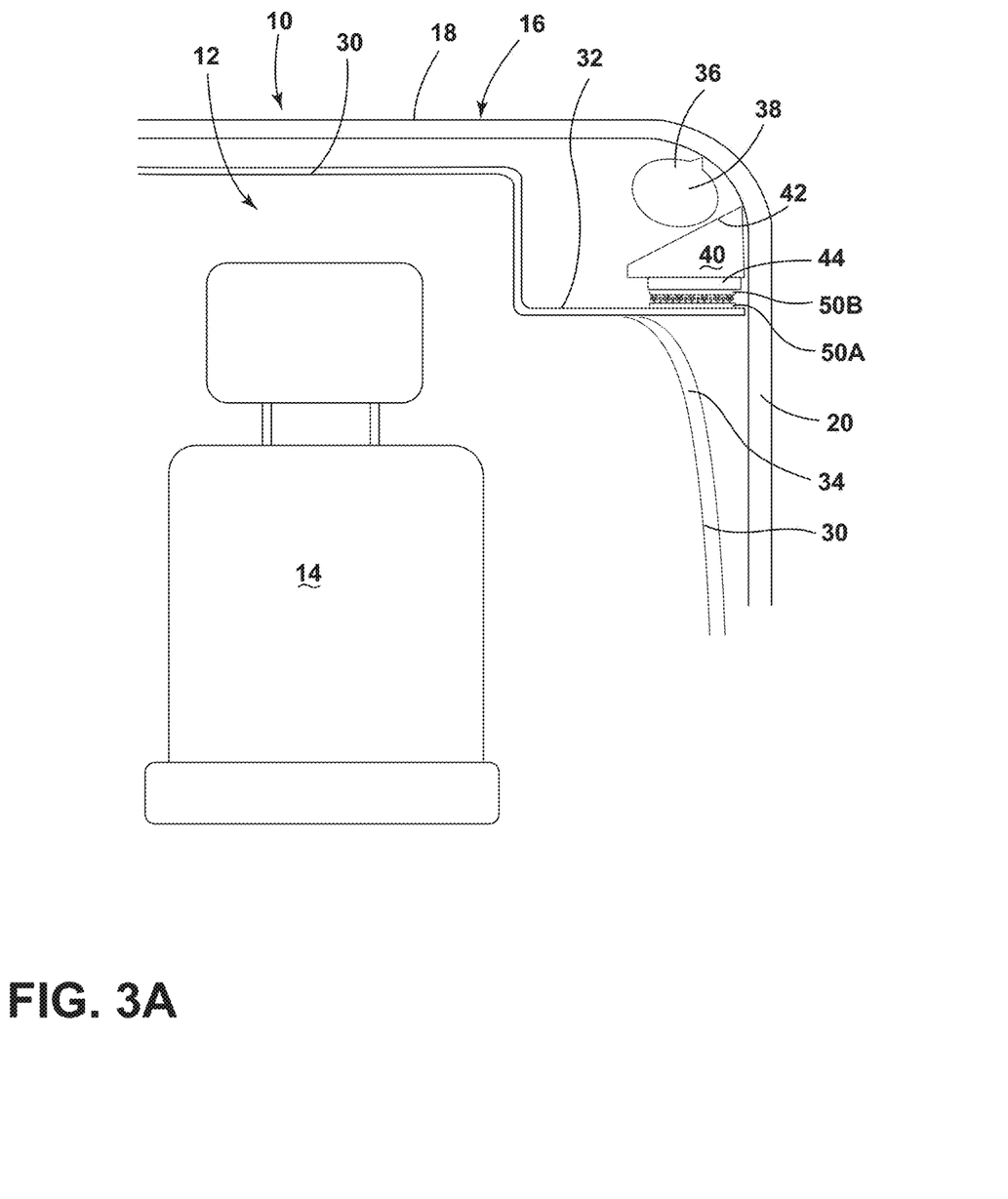
FIG. 3A is a perspective view of the vehicle interior illustrating the airbag in a retracted position and the headliner in an aligned position, according to one embodiment.
Figure 3B:
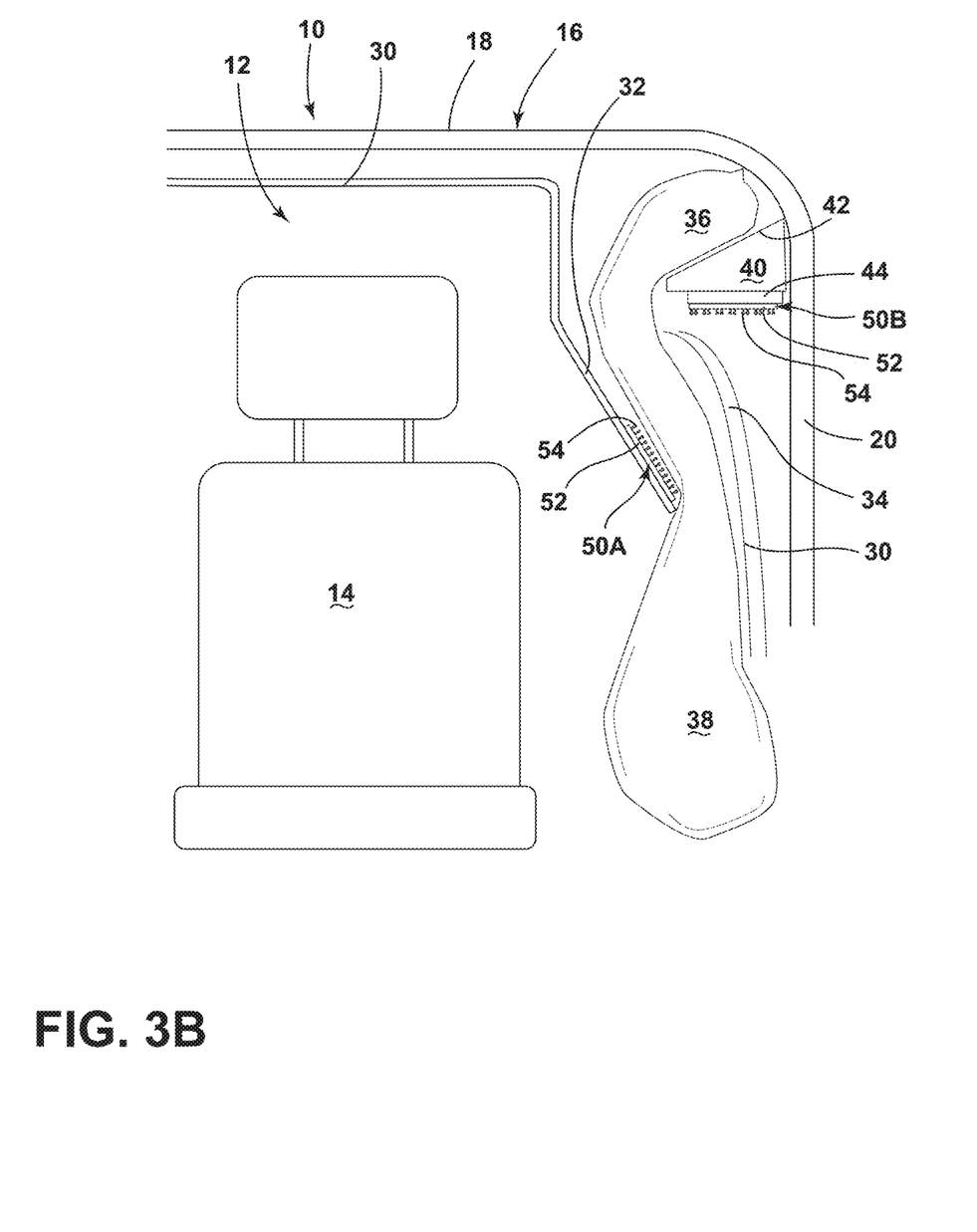
FIG. 3B is a perspective view of the vehicle interior illustrating the airbag in a deployed position, according to one embodiment.

Referring now to FIGS. 2-3B, in various embodiments, the vehicle 10 may include one or more trim panels 30. The trim panels 30 may be coupled to the vehicle 10. In some embodiments, the trim panels 30 may be coupled to the body 16 of the vehicle 10. For example, in some embodiments, the trim panels 30 may be coupled to the roof 18 and/or the pillars 20 of the vehicle 10. It is contemplated that, in various embodiments, the trim panels 30 may be coupled to various other portions and/or components of the vehicle 10.

In further reference to FIGS. 2-3B, in some embodiments, the one or more trim panels 30 may include a headliner 32. The headliner 32 may be coupled to the vehicle 10. In various embodiments, the headliner 32 may be coupled to the body 16 of the vehicle 10. For example, the headliner 32 may be coupled to the roof 18 of the vehicle 10. It is contemplated that, in some embodiments, that the headliner 32 may be coupled to one or more pillars 20 of the body 16 of the vehicle 10. As shown in FIGS. 2-3B, in some embodiments, the headliner 32 may be coupled to a ramp feature 40, as will be discussed in more detail below. It is contemplated that the headliner 32 may be coupled to various other vehicle portions and/or components. For example, in some embodiments, the headliner 32 may be coupled to other trim panels 30 of the vehicle 10 (e.g., headliner 32, a pillar trim piece 34, etc.).

Referring further to FIGS. 2-3B, in some embodiments, the one or more trim panels 30 of the vehicle 10 may include the pillar trim piece 34. As shown in FIG. 2, the pillar trim piece 34 may be coupled to and generally cover the pillar 20 of the body 16 of the vehicle 10. In some embodiments, the pillar trim piece 34 may be coupled to and/or in contact with the headliner 32 of the vehicle 10. For example, as shown in FIGS. 2 and 3A, the headliner 32 may extend above the pillar trim piece 34 and beyond a periphery of the pillar trim piece 34 in the vehicle-lateral-outboard direction, such that the headliner 32 generally rests upon a portion of the pillar trim piece 34. It is contemplated that, in various other embodiments, the headliner 32 and/or the pillar trim piece 34 may be arranged in various ways relative to each other and/or other components of the vehicle 10.

Referring now to FIGS. 2 and 3A, in various embodiments, the trim panels 30 of the vehicle 10 may be positioned in an aligned position. In various embodiments, the trim panels 30 may be positioned in the aligned position when the trim panels 30 are assembled in the vehicle 10 for ordinary operation of the vehicle 10. For example, the headliner 32 and the pillar trim piece 34 shown in FIG. 3A are shown in the aligned position, as the headliner 32 and the pillar trim piece 34 are assembled in the vehicle 10 for ordinary use of the vehicle 10. On the other hand, the headliner 32 of the vehicle 10 shown in FIG. 3B is not in the aligned position, as the headliner 32 is shown as displaced from the aligned position by a deployed airbag 36. In this way, the headliner 32 may be operable between a first position, shown in FIG. 3A, and a second position, shown in FIG. 3B. The first position of the headliner 32 may be the aligned position in various embodiments. The second position may generally be the position of the headliner 32 after deployment of the airbag 36.

Referring now to FIGS. 2-3B, in various embodiments, the vehicle 10 may include the airbag 36. In some embodiments, the airbag 36 may include one or more airbags 36. Further, in some embodiments, the airbag 36 may include an air curtain 38. The air curtain 38 may be positioned between one or more trim panels 30 of the vehicle 10 and the body 16 of the vehicle 10. For example, in some embodiments, the air curtain 38 may be positioned between the headliner 32 and the roof 18 of the vehicle 10. In various embodiments, the airbag 36 and/or air curtain 38 may be positioned vehicle-upward of at least a portion of the headliner 32, as shown in FIGS. 2 and 3A. It is contemplated that, in some embodiments, the air curtain 38 may be at least partially positioned between other components of the vehicle 10. For example, in some embodiments, at least a portion of the air curtain 38 may be positioned between the pillar 20 and the pillar trim piece 34 of the vehicle 10. It is contemplated that, in various embodiments, the airbag 36 may be disposed in various positions of the vehicle 10. As depicted in FIG. 2, in some embodiments, the airbag 36 may be disposed generally above the pillar 20 of the vehicle 10. It is contemplated that, in some embodiments, the airbag 36 may extend vehicle-longitudinally along the roof 18 and/or headliner 32 of the vehicle 10, as shown in FIG. 1. As such, in some embodiments, the airbag 36 may extend between multiple pillars 20 of the vehicle 10 and may cover multiple windows 26 and/or side windows 28 upon deployment.

Referring now to FIGS. 1-3B, in various embodiments, the airbag 36 may be configured to deploy from a retracted position to a deployed position within the vehicle 10. As shown in FIGS. 3A and 3B, the airbag 36 may deploy generally, substantially, and/or majorly in the vehicle-downward direction from the retracted position to the deployed position. For example, the air curtain 38 may be configured to deploy from above the headliner 32 substantially vehicle-downward into the cabin of the vehicle 10, such that the air curtain 38 covers at least a portion of one or more side windows 28 of the vehicle 10. In various embodiments, deployment of the airbag 36 from the retracted position to the deployed position may cause one or more trim panels 30 to yield and/or change position as the airbag 36 deploys. For example, as depicted in FIGS. 3A and 3B, deployment of the air curtain 38 may cause the headliner 32 of the vehicle 10 to yield as the air curtain 38 deploys in a generally, substantially, and/or majorly vehicle-downward direction, which causes the headliner 32 to leave the aligned position. In various embodiments, deployment of the airbag 36 from the retracted position to the deployed position may move the headliner 32 from the first position to the second position, as shown in FIGS. 3A and 3B.

Referring now to FIGS. 2-3B, in some embodiments, the vehicle 10 may include the ramp feature 40 configured to guide the direction of the airbag 36 as the airbag 36 deploys from the retracted position to the deployed position. In some embodiments, the ramp feature 40 may guide the direction of deployment of the airbag 36 such that deployment of the airbag 36 is not hindered by the pillar trim piece 34 of the vehicle 10. For example, in one embodiment, depicted in FIGS. 3A and 3B, the airbag 36 is configured to deploy generally vehicle-downward, which may, in some embodiments, cause the airbag 36 to come in contact with the pillar trim piece 34 as the airbag 36 moves from the retracted position to the deployed position. However, the presence of the ramp feature 40 between the airbag 36 and the pillar trim piece 34 may guide movement of the airbag 36 vehicle-inboard initially such that interference by the pillar trim piece 34 with deployment of the airbag 36 from the retracted position to the deployed position may be avoided and/or alleviated. Reducing impediments to deployment of the airbag 36 may be helpful in ensuring consistent and prompt deployment of the airbag 36 in the event of a vehicle 10 collision.

The ramp feature 40 may be coupled to various portions of the vehicle 10. In various embodiments, the ramp feature 40 may be coupled to the body 16 of the vehicle 10. In some embodiments, the ramp feature 40 may be coupled to the roof 18 of the vehicle 10. As shown in FIG. 2, in some embodiments, the ramp feature 40 may be coupled to the pillar 20 of the vehicle 10. In various embodiments, the ramp feature 40 may be positioned proximate to the pillar 20 of the vehicle 10. In some embodiments, the ramp feature 40 may be disposed proximate to the portion of the body 16 where the pillar 20 meets the roof 18.

Referring further to FIGS. 2-3B, in some embodiments, the ramp feature 40 may include a ramp portion 42. The ramp portion 42 of the ramp feature 40 may be on the vehicle-upward side of the ramp feature 40 and may be configured to influence the deployment path of the airbag 36 as it moves from the retracted position to the deployed position. For example, as shown in FIGS. 2-3B, the ramp portion 42 of the ramp feature 40 may include a surface that slopes vehicle-downward and inward from a point proximate to the body 16 of the vehicle 10. The ramp feature 40 may further include a base portion 44. The base portion 44 may be disposed on an underside of the ramp portion 42. In other words, the base portion 44 may be positioned vehicle-downward of the ramp portion 42 of the vehicle 10, in whole or in part. In various embodiments, when the ramp feature 40 is coupled to the vehicle 10, the base portion 44 of the ramp feature 40 may include a surface facing generally vehicle-downward. It is contemplated, that in some embodiments, the base portion 44 may be an underside of the ramp portion 42. In some embodiments, however, as shown in FIGS. 2-3B, the base portion 44 of the ramp feature 40 may include a structure extending from the ramp portion 42 of the ramp feature 40.

Figure 4:
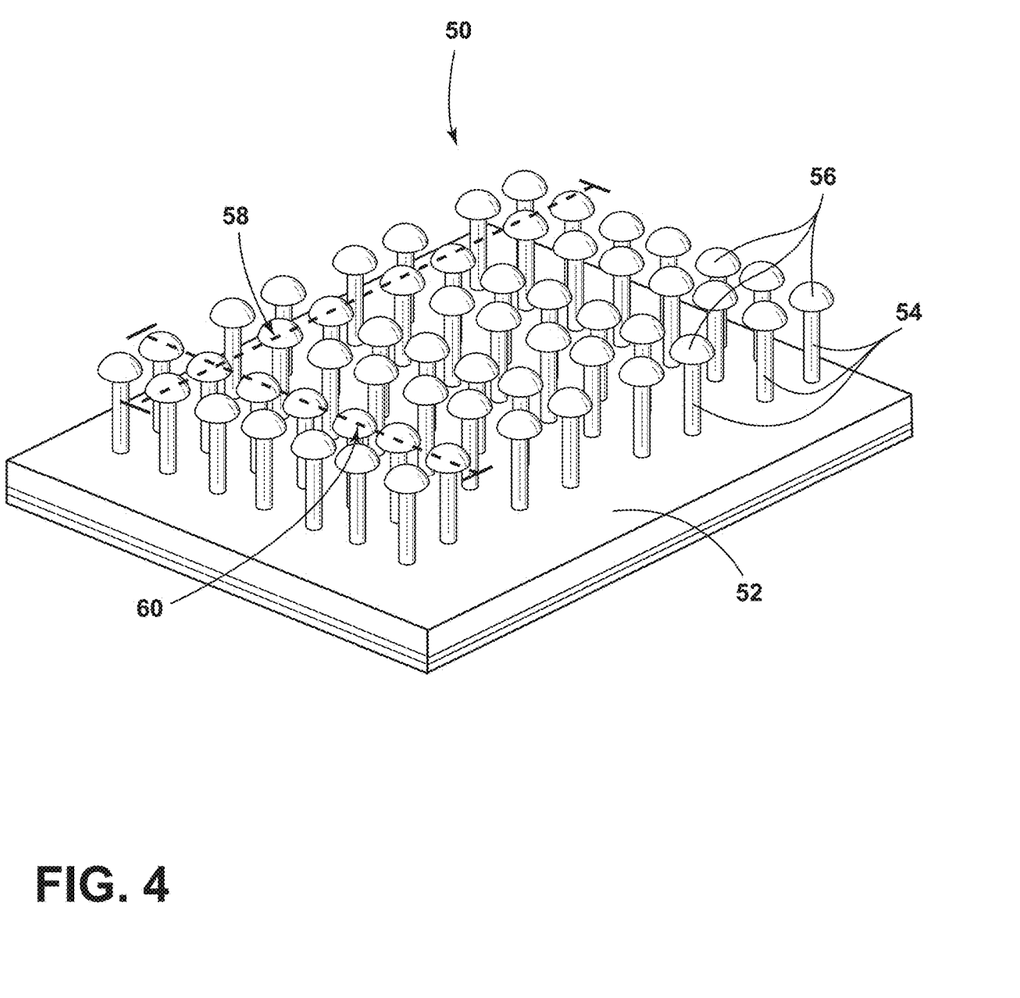
FIG. 4 is a perspective view of the first fastener coupled to a vehicle surface illustrating a plurality of engaging stems protruding outward from a substrate of the first fastener, according to one embodiment.
Figure 5A:
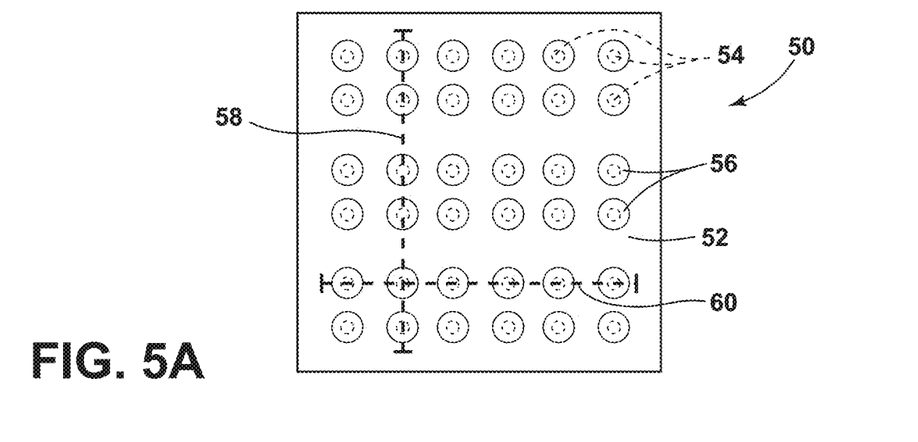
FIG. 5A is an elevational view of the fastener illustrating rows and columns of the plurality of engaging stems, according to one embodiment.
Figure 5B:
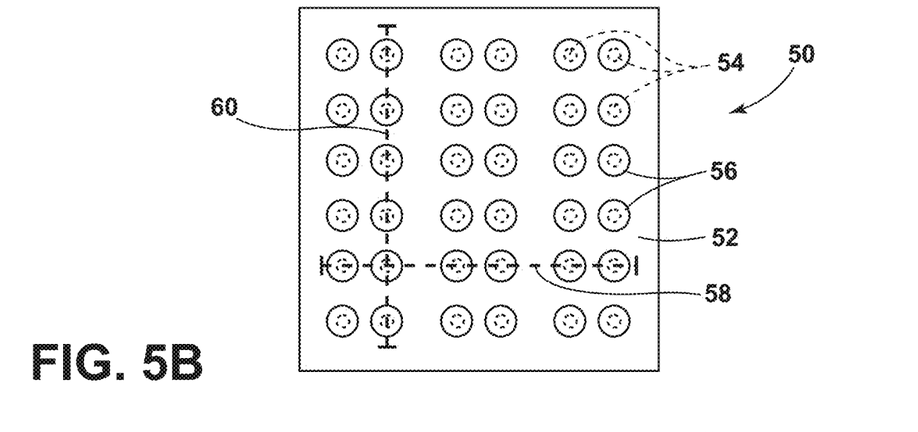
FIG. 5B is an elevational view of the fastener illustrating rows and columns of the plurality of engaging stems of the fastener in an orientation perpendicular to the rows and columns of the plurality of engaging stems illustrated in FIG. 5A, according to one embodiment.
Figure 5C:
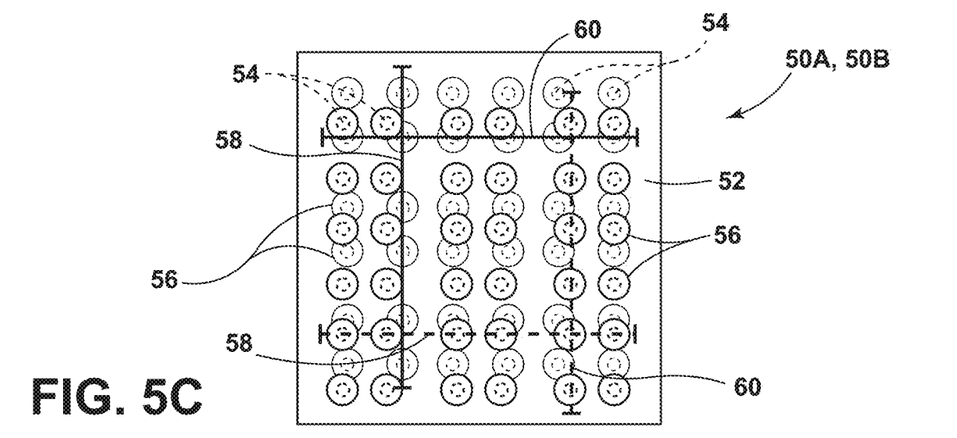
FIG. 5C is an elevational illustration of the rows and columns of engaging stems of the first fastener arranged perpendicularly to the rows and columns of engaging stems of the second fastener, according to one embodiment.
Figure 6:
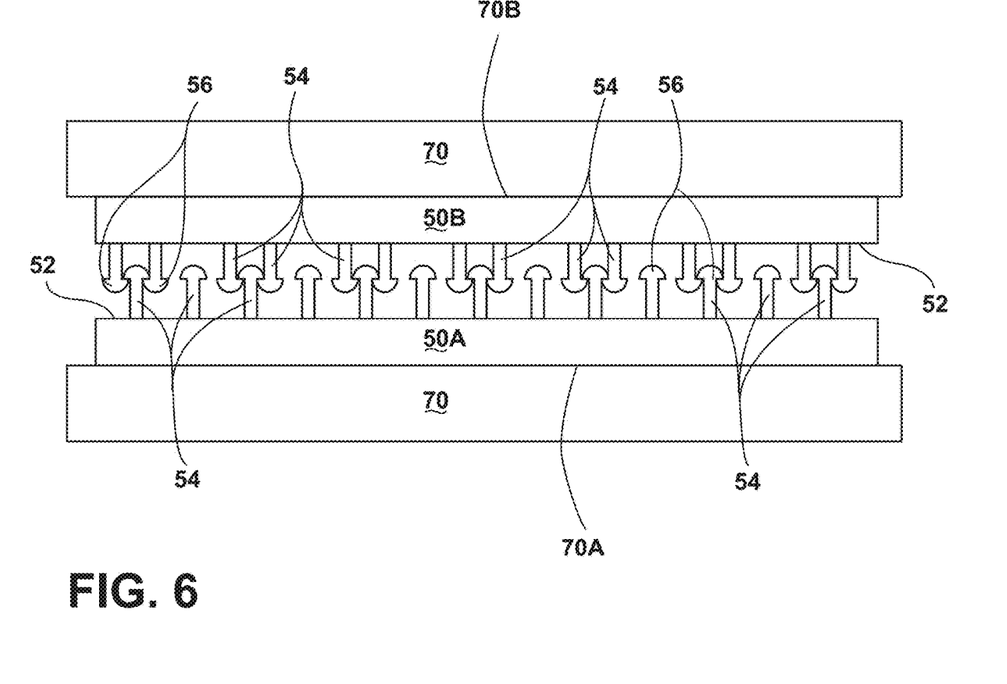
FIG. 6 is a side view of the first and second fasteners in engagement with one another, according to one embodiment.

In reference to FIGS. 2-6, in various embodiments, the vehicle 10 may include fasteners 50. For example, the vehicle 10 may include first and second fasteners 50A, 50B. As shown in FIG. 6, in various embodiments, the first and second fasteners 50A, 50B may be coupled to vehicle surfaces 70 and configured for releasable engagement with one another. In other words, the first fastener 50A may be configured for releasable engagement with the second fastener 50B. As depicted in FIG. 4, the fasteners 50 may include the substrate 52. The plurality of engaging stems 54 may protrude outward from the substrate 52. In some embodiments, the plurality of engaging stems 54 may protrude outward from the substrate 52 at an angle generally, substantially, and/or majorly normal to the surface of the substrate 52 that the plurality of engaging stems 54 are extending outward from. It is contemplated that, in some embodiments, the plurality of engaging stems 54 may protrude outward from the substrate 52 at angles that are not normal to the surface of the substrate 52 (e.g., acute, obtuse). In various embodiments, the plurality of engaging stems 54 of the fasteners 50 may include head portions 56 coupled to the ends of the engaging stems 54 that are distal to the ends of the engaging stems 54 coupled to the substrate 52. As will be further discussed below, the head portions 56 of the fasteners 50 may aid in retaining the fasteners 50 in engagement with one another. For example, the head portions 56 may aid in retaining the first fastener 50A and the second fasteners 50B in engagement with one another.

Referring now to FIGS. 4-5C, in various embodiments, the plurality of engaging stems 54 of the fasteners 50 may be arranged into rows 58 and columns 60 on the substrate 52. In other words, the engaging stems 54 on the fasteners 50 may be positioned relative to one another on the substrate 52 in such a way that the engaging stems 54 form rows 58 and columns 60 on the fasteners 50. Dashed lines designate examples of one of the rows 58 and one of the columns 60 in FIGS. 4-5B. Further, in FIG. 5C, which illustrates an embodiment where the first and second fasteners 50A, 50B are engaged with one another, dashed lines designate examples of one of the rows 58 and one of the columns 60 of the first fastener 50A, while solid lines designate examples of one of the rows 58 and one of the columns 60 of the second fastener 50B.

As depicted in FIGS. 4 and 5A, in various embodiments, adjacent rows 58 of engaging stems 54 may be generally equally spaced from one another. A row 58 positioned between first and second adjacent rows 58 may be generally equally distanced from the first adjacent row 58 and the second adjacent row 58. In other words, a given row 58 of engaging stems 54 may have as many as two rows 58 of engaging stems 54 adjacent to the given row 58; the adjacent rows 58 may run parallel to the given row 58 of engaging stems 54 on either side of the given row 58 of engaging stems 54, and the distance from the given row 58 of engaging stems 54 to the first adjacent row 58 of engaging stems 54 may be generally equal to the distance from the given row 58 of engaging stems 54 to the other adjacent row 58 of engaging stems 54.

In various embodiments, the columns 60 of engaging stems 54 may be oriented such that the distance between adjacent columns 60 alternates between a first distance and a second distance that is greater than the first distance. A column 60 between first and second adjacent columns 60 may be a first distance from the first adjacent column 60 and a second distance from the second adjacent column 60, wherein the second distance is greater than the first distance. In other words, a given column 60 of engaging stems 54 may have as many as two columns 60 of engaging stems 54 adjacent to the given column 60; the adjacent columns 60 may run parallel to the given column 60 on either side of the given column 60 of engaging stems 54, and the distance from the given column 60 of engaging stems 54 to the first adjacent column 60 of engaging stems 54 may be a first distance, while the distance from the given column 60 of engaging stems 54 to the other adjacent column 60 may be a second distance, wherein the second distance is greater than the first distance.

This orientation of columns 60 may resemble a plurality of pairs of columns 60, as shown in FIGS. 5A and 5B. A given set of paired columns 60 may be a first distance from one another, and the nearest column 60 of the set of paired columns 60 may be a second distance from the nearest column 60 of an adjacent set of paired columns 60, wherein the second distance is greater than the first distance. It is contemplated that with respect to the distance between rows 58 of engaging stems 54 and with respect to the distance between columns 60 of engaging stems 54, in some embodiments, the distances may be measured from at least one of a variety of portions of the engaging stems 54. For example, in some embodiments, the distance between engaging stems 54 may be measured from the base of the engaging stems 54 where the engaging stems 54 begin to protrude out of the substrate 52. Further, in some embodiments, the distance between engaging stems 54 may be measured from the head portions 56 of the engaging stems 54. It is further contemplated that, in some embodiments, the spacing between the rows 58 and columns 60 of engaging stems 54 may be based on the spacing between the rows 58 and columns 60 when the first fastener 50A and the second fastener 50B are not in the engaged positon, as the engaging stems 54 may be biased to positions relative to one another in a relatively unpredictable manner when the first fastener 50A is engaged with the second fastener 50B.

As shown in FIGS. 5A and 5B, in various embodiments, the rows 58 of the fastener 50 may be generally perpendicular to the columns 60 of the same fastener 50. For example, the rows 58 of the first fastener 50A may be generally perpendicular to the columns 60 of the first fastener 50A. In some embodiments, the rows 58 and columns 60 of the fasteners 50 may be generally straight. Further, in some embodiments, each of the first and second fasteners 50A, 50B may have engaging stem densities of about 170 engaging stems per square inch of substrate 52. It should be appreciated that a square inch of substrate 52 refers to square inches of the surface of the substrate 52 that the plurality of engaging stems 54 are protruding outward from.

In reference to FIGS. 4-6, the fasteners 50 may be coupled to various vehicle surfaces 70 and may be configured for releasable engagement with each other. For example, as shown in FIG. 6, in some embodiments, the first fastener 50A may be coupled to the first vehicle surface 70A and the second fastener 50B may be coupled to the second vehicle surface 70B. In various embodiments, the substrate 52 of the fasteners 50 may be coupled to vehicle surfaces 70 such as the trim panels 30, the headliner 32, the body 16 of the vehicle 10, the pillars 20, the roof 18, the ramp feature 40 and/or various other components of the vehicle 10. It is contemplated that the side of the substrate 52 opposite the side of the substrate 52 that the plurality of engaging stems 54 protrude outward from may be coupled to the one or more vehicle surfaces 70 via a variety of mechanisms. For example, in various embodiments, the substrate 52 may be coupled to the vehicle surface 70 via an adhesive. However, various other features for coupling the substrate 52 to the vehicle surfaces 70 may be used (e.g., hook and loop, snap-fit, etc.).

Referring now to FIG. 6, in various embodiments, the first fastener 50A may be configured to engage with the second fastener 50B. As shown in FIG. 6, engagement of the first fastener 50A to the second fastener 50B may be achieved by compressing the first fastener 50A against the second fastener 50B such that the plurality of engaging stems 54 on each of the first and second fasteners 50A, 50B interlock. This interlocking of the plurality of engaging stems 54 may be made more resistant to decoupling by the engagement of the head portions 56 of the engaging stems 54 with one another, as shown in FIG. 6. The head portions 56 may aid in holding the first and second fasteners 50A, 50B in tensile engagement, while the plurality of engaging stems 54 of the first and second fasteners 50A, 50B may aid in holding the first and second fasteners 50A, 50B in sheer engagement.

Referring further now to FIG. 6, in various embodiments, the first fastener 50A being engaged with the second fastener 50B may couple the first vehicle surface 70A coupled to the substrate 52 of the first fastener 50A to the second vehicle surface 70B coupled to the substrate 52 of the second fastener 50B. For example, in various embodiments, the trim panel 30 may be coupled to the vehicle 10 via engagement of the first and second fasteners 50A, 50B. In some embodiments, the headliner 32 may be coupled to the roof 18 via engagement of the first fastener 50A to the second fastener 50B. Further, as shown in FIGS. 2 and 3A, in some embodiments, the headliner 32 may be coupled to the ramp feature 40 via engagement of the first fastener 50A to the second fastener 50B. Further, in some embodiments, the headliner 32 may be coupled to the base portion 44 of the ramp feature 40 via the first fastener 50A being engaged with the second fastener 50B. In such an embodiment, the plurality of engaging stems 54 protruding from the second fastener 50B may extend and/or protrude in the generally vehicle-downward direction. It is contemplated that, in various embodiments, at least one of the first fastener 50A and the second fastener 50B may be coupled to the vehicle surface 70, such that the plurality of engaging stems 54 may be protruding in a generally vehicle-downward direction.

Referring now to FIGS. 5A-5C, in various embodiments, the rows 58 of engaging stems 54 of the first fastener 50A may be generally, substantially, majorly and/or entirely, perpendicular to the rows 58 of the engaging stems 54 protruding outward from the second fastener 50B when the first fastener 50A is engaged with the second fastener 50B. Accordingly, the columns 60 of engaging stems 54 of the first fastener 50A may be generally perpendicular to the columns 60 of the engaging stems 54 of the second fastener 50B when the first fastener 50A is engaged with the second fastener 50B. Further, in various embodiments, the rows 58 of engaging stems 54 of the first fastener 50A may be generally parallel to the columns 60 of engaging stems 54 of the second fastener 50B when the first fastener 50A is engaged with the second fastener 50B. This perpendicular orientation of the first fastener 50A relative to the second fastener 50B is illustrated in FIG. 5C.

Orienting the first fastener 50A relative to the second fastener 50B such that the rows 58 of the first fastener 50A are generally perpendicular to the rows 58 of the second fastener 50B may result in an increase in sheer force resistance between the first fastener 50A and the second fastener 50B when the first fastener 50A is in engagement with the second fastener 50B. This orientation of fasteners 50 may have a negligible effect, however, on the tensile force required to separate the first fastener 50A from the second fastener 50B compared to other orientations of the fasteners 50 relative to each other. The negligible effect on tensile resistance and the increase in sheer resistance between the first fastener 50A and the second fastener 50B may be achieved, in some embodiments, when both the first fastener 50A and the second fastener 50B have engaging stem densities of about 170 engaging stems 54 per square inch of substrate 52 and the rows 58 of the first fastener 50A are generally perpendicular to the rows 58 of the second fastener 50B. Further, engaging first and second fasteners 50A, 50B with each where both of the fasteners 50 have engaging stem 54 densities of 170 per square inch, may result in tensile separation resistance that is undesirably low for typical uses of reclosable fasteners similar to the fasteners 50. For example, 3M™ DUAL LOCK™ Reclosable Fasteners that have a stem density of 170 stems per square inch are affirmatively not recommended for engagement with other 3M™ DUAL LOCK™ Reclosable Fasteners that have stem densities of 170 stems per square inch. Instead, 3M™ DUAL LOCK™ Reclosable Fasteners that have a stem density of 170 stems per square inch are recommended for engagement with 3M™ DUAL LOCK™ Reclosable Fasteners that have a stem density of 250 or 400 stems per square inch. However, low tensile separation resistance and increased sheer separation resistance between the first fastener 50A and the second fastener 50B may be desirable for coupling the headliner 32 to the vehicle 10 in such a way that the headliner 32 stays in the aligned position relative to the vehicle 10 during normal use of the vehicle 10, due to the increased sheer separation resistance, yet quickly decouples from the vehicle 10 as the headliner 32 yields to the airbag 36 deploying from the retracted position to the deployed position, due to the negligible tensile separation resistance.

Figure 7A:
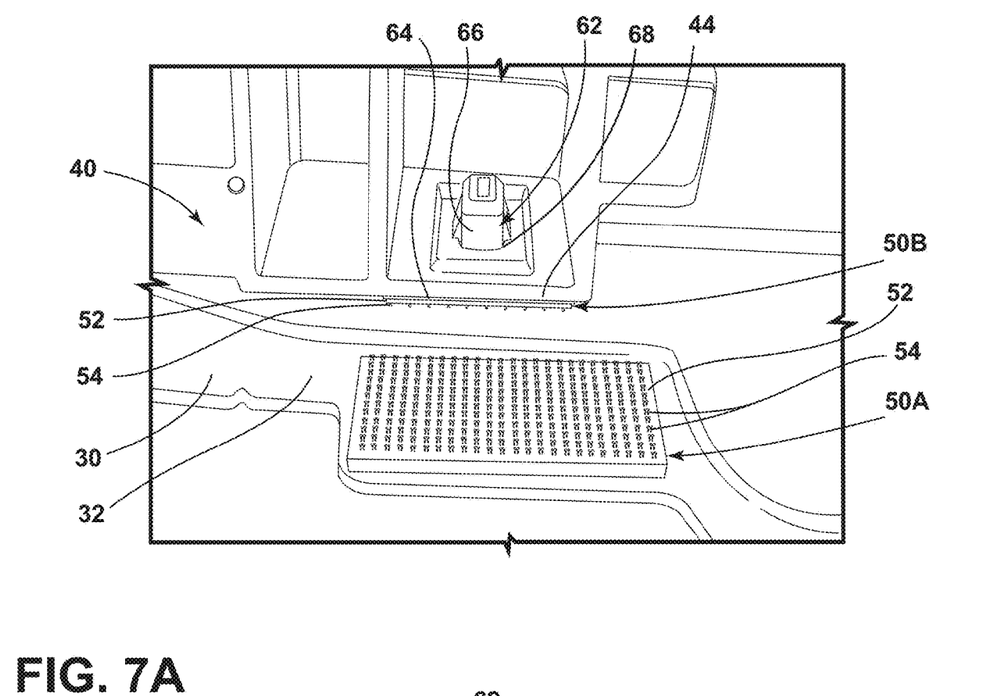
FIG. 7A is an upper elevational view of the first fastener coupled to an attachment feature that is coupled to a ramp feature, and the second fastener coupled to a headliner of the vehicle, according to one embodiment.
Figure 7B:
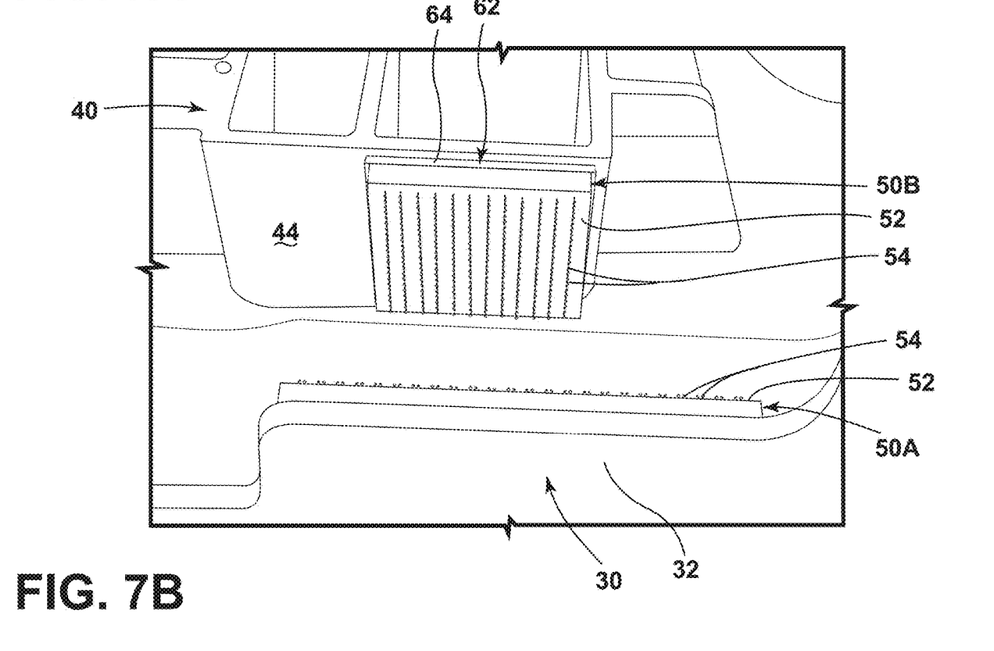
FIG. 7B is a lower elevational view of the first fastener coupled to the ramp feature and the second fastener coupled to the headliner of the vehicle, according to one embodiment.

In reference to FIGS. 7A and 7B, in some embodiments, the second fastener 50B may be coupled to the vehicle surface 70 such that the rows 58 of the second fastener 50B would be perpendicular to the rows 58 of the first fastener 50A that is coupled to the trim panel 30 when the trim panel 30 is in the aligned positon relative to the vehicle 10. For example, the second fastener 50B may be coupled to the base portion 44 of the ramp feature 40, and the first fastener 50A may be coupled to the headliner 32, such that assembly of the headliner 32 to the aligned positon in the vehicle 10 causes the first fastener 50A to engage the second fastener 50B in such a way that the rows 58 of the first fastener 50A are generally perpendicular to the rows 58 of the second fastener 50B.

Referring further to FIGS. 7A and 7B, in some embodiments, the second fastener 50B may be coupled to an attachment feature 62 that is configured to be coupled to a component of the vehicle 10 in a consistent orientation. For example, as shown in FIG. 7A, the attachment feature 62 may include a platform 64 upon which the second fastener 50B is configured to be adhered, and a key feature 66 configured to matingly engage with a key slot feature 68 defined by the base portion 44 of the ramp feature 40. In such an embodiment, the key feature 66 may be shaped such that mating engagement with the key slot feature 68 results in the platform 64 of the attachment feature 62 being oriented in a consistent fashion relative to the ramp feature 40. Consistent orientation of the attachment feature 62 may allow for consistent orientation of the rows 58 and/or columns 60 of the second fastener 50B coupled to the attachment feature 62. Further, as the aligned positon of the trim panels 30 in the vehicle 10 may be generally consistent relative to other components of the vehicle 10 (e.g., the ramp feature 40, trim panels 30, the roof 18, the pillars 20, etc.) the first fastener 50A may be coupled to the trim panel 30 in such a way that positioning the trim panels 30 in the aligned position results in the rows 58 of the first fastener 50A being oriented such that the rows 58 are generally perpendicular to the rows 58 of the second fastener 50B that is coupled to the attachment feature 62. It is contemplated that the first fastener 50A and/or the second fastener 50B may be coupled to one or more attachment features 62 and that the one or more attachment features 62 may be coupled to various vehicle 10 components. It is further contemplated that, in some examples, the first and second fasteners 50A, 50B may be coupled directly to components of the vehicle 10, such as the body 16 and/or the trim panels 30.

In operation, in some embodiments, the second fastener 50B may be coupled to the base portion 44 of the ramp feature 40, such that the plurality of engaging stems 54 protruding out of the substrate 52 of the second fastener 50B are directed generally vehicle-downward. The first fastener 50A may be coupled to the headliner 32 and may be configured to engage with the second fastener 50B when the headliner 32 is assembled to the vehicle 10 in the aligned position, wherein engagement of the first fastener 50A to the second fastener 50B results in the rows 58 of engaging stems 54 of the first fastener 50A being generally perpendicular to the rows 58 of the engaging stems 54 of the second fastener 50B. During normal use of the vehicle 10, wherein the headliner 32 remains in the aligned position, the perpendicular arrangement of the first fastener 50A relative to the second fastener 50B may aid in retaining the headliner 32 in the aligned position within the vehicle 10. Upon the occurrence of a vehicle 10 collision, the airbag 36 may deploy from above the headliner 32 from the retracted position to the deployed position in the generally vehicle-downward direction. Deployment of the airbag 36 causes the first fastener 50A to disengage from the second fastener 50B as the headliner 32 yields to the force of the deploying airbag 36 and moves out of the aligned position from the first position to the second position.

The present disclosure may provide a variety of advantages. First, orienting the first fastener 50A relative to the second fastener 50B such that the rows 58 of the first fastener 50A are generally perpendicular to the rows 58 of the second fastener 50B may result in separation resistance between the first and second fasteners 50A, 50B that retains the headliner 32 in the aligned position, yet generally minimizes undesirable resistance to the deployment of the airbag 36. Second, one or more attachment features 62 operable to be coupled to the vehicle 10 in a consistent orientation may aid in ensuring that the second fastener 50B is oriented generally perpendicularly to the first fastener 50A when the first and second fasteners 50A, 50B are engaged with one another.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trim attachment system for a vehicle, comprising:
a first fastener coupled to a first vehicle surface; and
a second fastener coupled to a second vehicle surface and configured for releasable engagement with the first fastener, wherein each of the first and second fasteners comprises:
a substrate; and
a plurality of engaging stems protruding outward from the substrate and arranged into rows and columns on the substrate, wherein a row positioned between first and second adjacent rows is generally equally distanced from the first adjacent row and the second adjacent row, a column positioned between first and second adjacent columns is a first distance from the first adjacent column and a second distance from the second adjacent column, wherein the second distance is greater than the first distance, and wherein the plurality of engaging stems includes a first engaging stem that is arranged into the row and the column, a second engaging stem that is arranged into the row and the first adjacent column, and a third engaging stem that is arranged into the row and the second adjacent column,
wherein the first fastener is configured to be coupled to the second fastener such that the plurality of engaging stems of the first fastener engage the plurality of engaging stems of the second fastener and the rows of the first fastener are generally perpendicular to the rows of the second fastener.

2. The trim attachment system of claim 1, wherein each of the first and second fasteners have engaging stem densities of about 170 engaging stems per square inch of substrate.

3. The trim attachment system of claim 1, wherein the rows of the first fastener are generally perpendicular to the columns of the first fastener.

4. The trim attachment system of claim 1, wherein the rows and columns of the first fastener are generally straight.

5. The trim attachment system of claim 1, wherein the plurality of engaging stems of the first and second fasteners include head portions coupled to the ends of the engaging stems distal to the ends of the engaging stems protruding from the substrate and configured to yieldingly retain the first and second fasteners in engagement with each other.

6. A trim attachment system for a vehicle, comprising:
a trim panel configured to be coupled to the vehicle while in an aligned position relative to the vehicle;
a first fastener coupled to the trim panel; and
a second fastener coupled to the vehicle and configured for releasable engagement with the first fastener, wherein each of the first and second fasteners comprises:
a substrate; and
a plurality of engaging stems protruding outward from the substrate and arranged into rows and columns on the substrate, wherein a row positioned between first and second adjacent rows is generally equally distanced from the first adjacent row and the second adjacent row, a column positioned between first and second adjacent columns is a first distance from the first adjacent column and a second distance from the second adjacent column, wherein the second distance is greater than the first distance, and wherein the plurality of engaging stems includes a first engaging stem that is arranged into the row and the column, a second engaging stem that is arranged into the row and the first adjacent column, and a third engaging stem that is arranged into the row and the second adjacent column,
wherein the first fastener is configured to be coupled to the second fastener such that the plurality of engaging stems of the first fastener engage the plurality of engaging stems of the second fastener, and positioning the trim panel in the aligned position relative to the vehicle orients the rows of the first fastener generally perpendicularly to the rows of the second fastener.

7. The trim attachment system of claim 6, wherein each of the first and second fasteners have engaging stem densities of about 170 engaging stems per square inch of substrate.

8. The trim attachment system of claim 6, wherein the rows of the first fastener are generally perpendicular to the columns of the first fastener.

9. The trim attachment system of claim 6, wherein the rows and columns of the first fastener are generally straight.

10. The trim attachment system of claim 6, wherein the plurality of engaging stems of the first and second fasteners include head portions coupled to the end of the engaging stems distal to the end of the engaging stems protruding from the substrate and configured to yieldingly retain the first and second fasteners in engagement with each other.

11. The trim attachment system of claim 6, wherein the trim panel comprises:
a headliner.

12. The trim attachment system of claim 11, wherein the plurality of engaging stems protruding outward from the substrate of the second fastener protrude in a generally vehicle-downward direction.

13. A system for a vehicle, comprising:
a headliner operably coupled to the vehicle and operable between a first position and a second position;
an airbag positioned vehicle-upward of at least a portion of the headliner and configured to deploy from a retracted position to a deployed position; and
a first fastener coupled to the headliner; and
a second fastener coupled to the vehicle and configured for releasable engagement with the first fastener, wherein each of the first and second fasteners comprises:
a substrate; and
a plurality of engaging stems protruding outward from the substrate, wherein the first fastener is in releasable engagement with the second fastener such that the plurality of engaging stems of the first fastener engage the plurality of engaging stems of the second fastener when the headliner is in the first position, and deployment of the airbag from the retracted position to the deployed position moves the headliner from the first position to the second position, and wherein the plurality of engaging stems are arranged into rows and columns on the substrate, a row positioned between first and second adjacent rows is generally equally distanced from the first adjacent row and the second adjacent row, a column positioned between first and second adjacent columns is a first distance from the first adjacent column and a second distance from the second adjacent column, wherein the second distance is greater than the first distance, and the rows of the first fastener are oriented generally perpendicularly to the rows of the second fastener when the headliner is in the first position, and wherein the plurality of engaging stems of the first fastener includes a first engaging stem that is arranged into the row and the column, a second engaging stem that is arranged into the row and the first adjacent column, and a third engaging stem that is arranged into the row and the second adjacent column.

14. The trim attachment system of claim 13, wherein the rows of the first fastener are generally perpendicular to the columns of the first fastener.

15. The trim attachment system of claim 13, wherein the rows and columns of the first fastener are generally straight.

16. The trim attachment system of claim 13, wherein the airbag deploys substantially vehicle-downward from the retracted position to the deployed position.

17. The trim attachment system of claim 16, wherein the airbag comprises:
   an air curtain configured to cover a side window of the vehicle.

18. The trim attachment system of claim 13, wherein the plurality of engaging stems protruding outward from the substrate of the second fastener protrude in a generally vehicle-downward direction.

19. The trim attachment system of claim 13, wherein each of the first and second fasteners have engaging stem densities of about 170 engaging stems per square inch of substrate.

* * * * *